United States Patent [19]
Whittaker

[11] Patent Number: 5,928,310
[45] Date of Patent: Jul. 27, 1999

[54] DIGITAL DEVICE CONTROL METHOD AND SYSTEM VIA LINEAR FUNCTION GENERATOR IMPLEMENTATION USING ADDER FOR INTERCEPT

[75] Inventor: Bruce Ernest Whittaker, Mission Viejo, Calif.

[73] Assignee: Unisys Corporation, Blue Bell, Pa.

[21] Appl. No.: 08/919,389

[22] Filed: Aug. 28, 1997

[51] Int. Cl.[6] ............................... G06F 1/02; G05B 11/01
[52] U.S. Cl. ...................... 708/274; 364/148.01
[58] Field of Search ............................ 364/719, 724.011, 364/724.19, 736.02, 148.01, 148.09, 157; 318/611, 616, 617, 628

[56] References Cited

U.S. PATENT DOCUMENTS

| | | | |
|---|---|---|---|
| 4,052,598 | 10/1977 | Turner et al. ........................... | 364/157 |
| 4,639,854 | 1/1987 | Kurokawa et al. ...................... | 364/157 |
| 4,953,076 | 8/1990 | Yamamoto ............................... | 364/176 |
| 5,589,749 | 12/1996 | Davidson et al. ....................... | 318/564 |

*Primary Examiner*—Chuong Dinh Ngo
*Attorney, Agent, or Firm*—Alfred W. Kozak; Mark T. Starr; Steven R. Petersen

[57] ABSTRACT

A system and method in a digital network for developing a digital output control signal Y which is of greater range and sensitivity than an input digital difference signal X wherein Y has a linear functional relationship to X according to a slope parameter "b". A method is developed for implementing the network with Field Programmable Gate Arrays (FPGAs) to develop the output control signal Y equal to a+bX on an expanded digital bus, where "a" is the intercept value of Y when X=0.

8 Claims, 12 Drawing Sheets

LINEAR FUNCTIONS

X = A − C    # STEPS REMAINING TO MOVE MOTOR

Y = a + bX   DRIVE VOLTAGE TO MOTOR

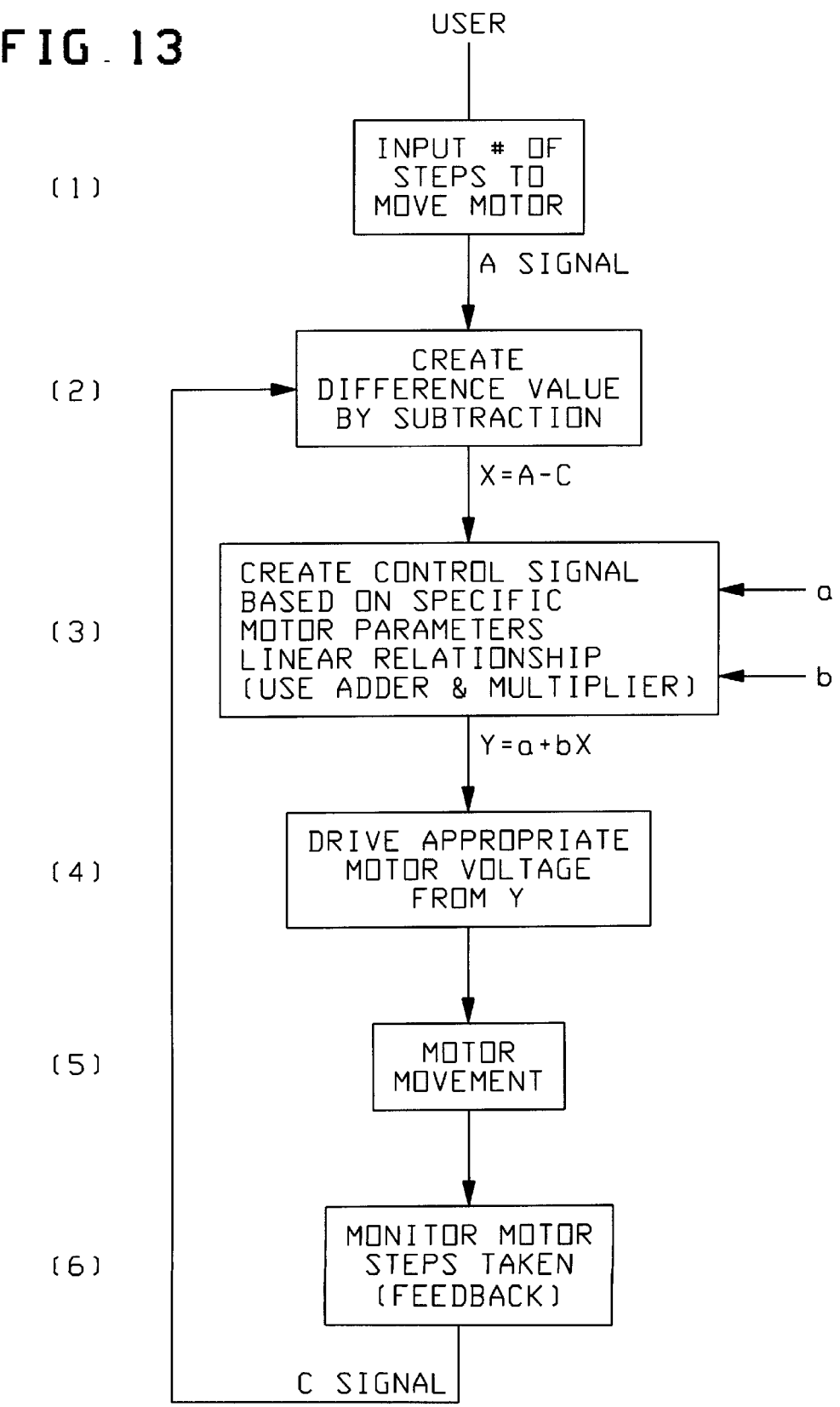

DIGITAL DEVICE CONTROL METHOD AND SYSTEM VIA LINEAR FUNCTION GENERATOR IMPLEMENTATION USING ADDER FOR INTERCEPT

CROSS-REFERENCE TO RELATED APPLICATIONS

This application is related to a co-pending U.S. application Ser. No. 980,358 filed Aug. 28, 1997, entitled "Linear Function Generator Method With Counter For Implementation of Control Signals in Digital Logic", and which is incorporated herein by reference.

FIELD OF THE INVENTION

This disclosure provides a method by which mathematical relationships representing electrical and electronic circuit elements can be implemented in basic programmable digital logic devices.

BACKGROUND OF THE INVENTION

A long history in the electronic industry has involved the use and development of analog electronic circuits. These were often correlated with mathematical relationships for representation of the function of various types of analog circuitry.

With the advent of digital logic design, the functional relationships of the prior analog circuitry and their mathematical representations could now be implemented by use of digital logic.

One of the particular functional relationships which are considered desirable have to do with linear relationships.

The presently described system and method illustrates how the mathematical and functional relationships of electronic circuitry can be represented in digital terms by the use of simple, standardized, logic design elements. These systems and methods can be built into simple industry-standard programmable logic elements, for example such as, PALs (Programmable Logic Arrays) or Field Programmable Gate Arrays (FPGAs).

By the utilization of these dense-type logic elements involving digital signals, then, instead of an analog circuit design, there can be achieved significant cost reductions, better reliability, wider control, programmable flexibility and greater simplicity.

Digital computers and related logic require "digital" binary values (not an analog voltage or current). If analog circuitry was used, then some form of analog-to-digital conversion was necessary to allow other digital logic to utilize the linear values.

If a linear relationship is created "digitally", then this extra analog-digital conversion circuitry is no longer required.

Also by using single standard FPGA (Field Programmable Gate Array) devices, the cost is reduced and the functions required can be modified and made flexible by the act of simple re-programming.

SUMMARY OF THE INVENTION

A method is provided for creating digital control signals to a target digital device, this method being efficiently implementable by digital signals derived from linear function generators.

A control system provides a linear function generator which receives inputs from an operator or electronic digital source (A) and subtracts a digital feedback signal (C) in a subtractor module to develop a difference signal (X) which is multiplied by a slope parameter "b" and then combined with an intercept value "a" to develop a control signal for the target device.

A multiplier module will increase the bus size (number of bits) of a control bus to the intercept adder which can further increase the control bus size for regulation of the target device.

Basically, the linear function generator includes the Subtractor module which subtracts the digital feedback signal (C) from an input signal (A) to develop a difference signal (X) on a first bus (6x).

A multiplier module multiplies the difference signal X by a slope value "b" to generate an expanded digital signal (bX) on a second output bus (7x) which has a greater number of digital bit lines than the number of bit lines of the first bus (6x).

An Adder module receives the signal on the second bus (7x) as input and adds in an intercept value "a" to provide an output control signal Y on a third bus (8x) which has a greater number of digital bit lines than the second bus (7x). The control signal Y is fed to a driver to provide the digital control signal (Yo) for a digital target module. Thus, a network of digital Subtractor, Multiplier and Adder modules enable the efficient implementation of control signals for the target module in Programmable Logic Arrays (PLAs) and Field Programmable Gate Arrays (FPGAS) in a simple, cost-effective manner.

BRIEF DESCRIPTION OF THE DRAWINGS

FIG. 13 is a flow chart illustrating the method for developing the output control signal.

GENERAL OVERVIEW

Figure 2A:
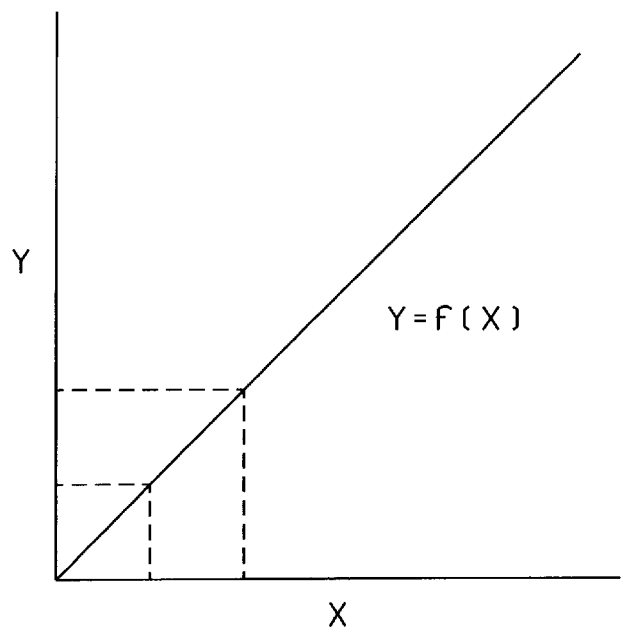
FIG. 2A is a diagram of a simple linear functional relationship between a parameter X in relation to a parameter Y.

Referring to FIG. 2A there is seen the graphical representation of a simple, linear functional relationship. Here, a value Y, which is on the vertical axis, is seen to be a basic function of "X" on the horizontal axis. As X increases (or decreases), the value Y increases (or decreases) in direct proportion. Thus, in FIG. 2A, the relationship equation can be indicated as Y=f (X), where f(X) is Y=mX where m is a constant.

Figure 2B:
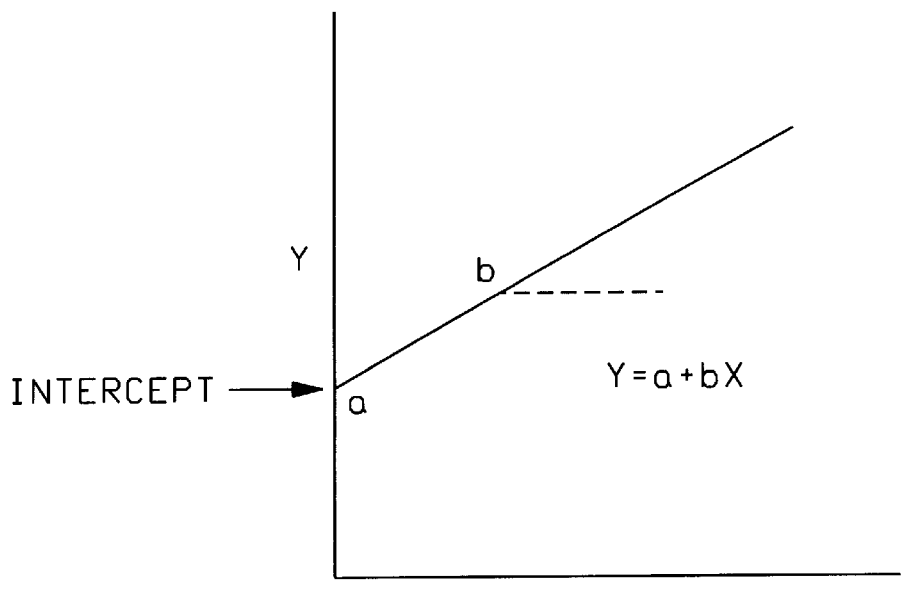
FIG. 2B shows a similar relation of X and Y but with an intercept "a" for Y when X=0 such that Y=a+bX.

FIG. 2B shows a more generalized linear function. Here, the relationships between Y and X are specified in their most general linear form by the equation:

$$Y = a + bX \qquad \text{(EQ1)}$$

Where a=intercept value of Y

Where b=slope of the line

Thus, it will be seen when the X value is zero (X=0), then Y has a value of "a", which is the intercept constant.

The other constant "b" controls how quickly Y will change as X changes, that is to say, the slope of the linear line. The greater the "b" value, the steeper the line and therefore, the greater impact each change in X has on the value of Y.

In the simplified case of FIG. 2A, the "a" has a value of "0", and "b" has the value of "1" when "b" has a 45° angle. Thus, at X=0, Y is also 0 (Y=0). Also it may be noted in this case, that for each unit change in X, there is a direct unit change in the value of Y. Thus, Y is proportional to X.

DESCRIPTION OF PREFERRED EMBODIMENT

Figure 1:
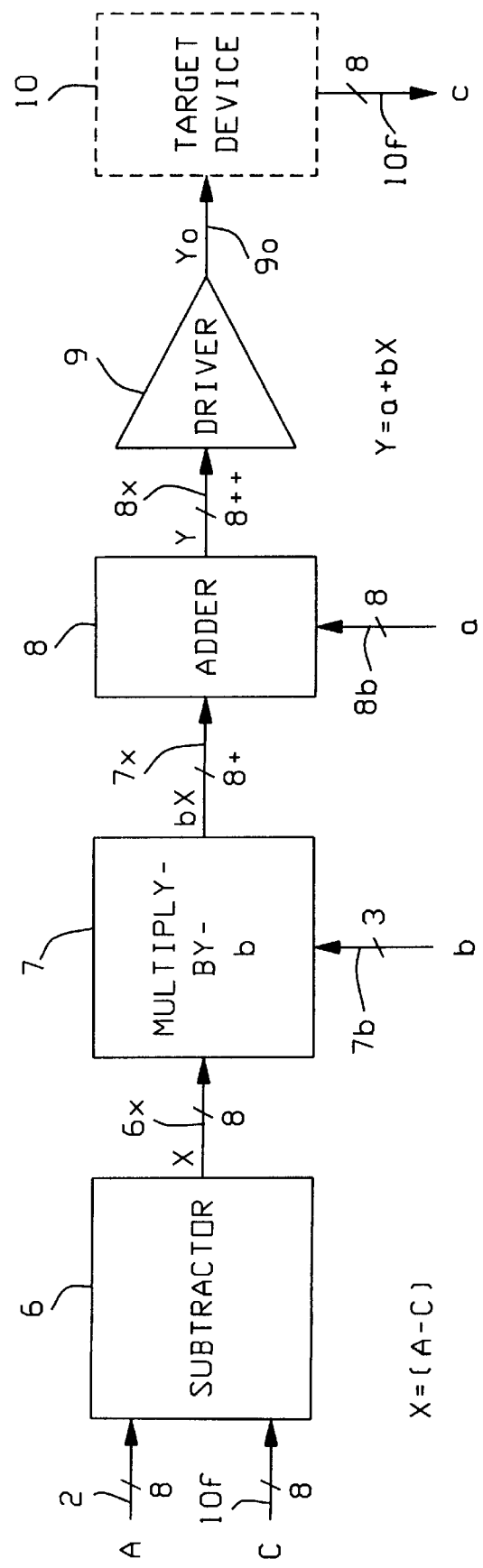
FIG. 1 is a block diagram illustrating how an input signal and feedback signal can be programmed to develop an output control signal of a precise linear nature.

FIG. 1 is a block diagram showing a linear relationship Adder method by which a control signal Yo can control a device 10 as a result of an input signal A on bus 2 and a feedback signal C on bus 10f. The signals A and C are fed to a Subtractor circuit 6 which provides an output X, on bus 6x, to a multiplier module 7 which has another input "b" which represents the slope line of FIG. 2B, and has an output bX on line 7x which is fed to the Adder module 8. The Adder module 8 has another input related to the intercept "a" of FIG. 2B, and then provides an output Y on line 8x which is amplified through a driver circuit 9 to provide the output control signal Yo to the target device 10.

In FIG. 1, it will be noted that the signal X is equal to A–C. The input signal A on line 2, and the feedback signal C on line 10f are both 8-bit bus lines, such that the output X of module 6 is an 8-bit bus output 6x and likewise, it is seen that that the multiplier module 7 has a 3-bit additional input "b" on input bus 7b which provides a digital output signal bX on output bus 7x, which may be greater than 8-bits, such that this output line is marked 8+ to show that this could be greater than the normal 8-bit line. The Adder module 8 takes the bX input from bus 7x, plus another 8-bit input from bus 8b, representing the value of "a" (intercept value) in FIG. 2B. This results in an output Y on bus 8x which is even larger in the number of bit lines involved than that of bus 7x. This bus 8x is marked with 8++ to show that it is larger than the prior input to the Adder which was marked 8+ on bus 7x.

The output signal Y on bus 8x is fed to the driver unit 9, which provides an output Yo which is fed to the particular target device under control designated 10. Thus, this completes the function Y=a+bX.

Control System Function

Figure 3:
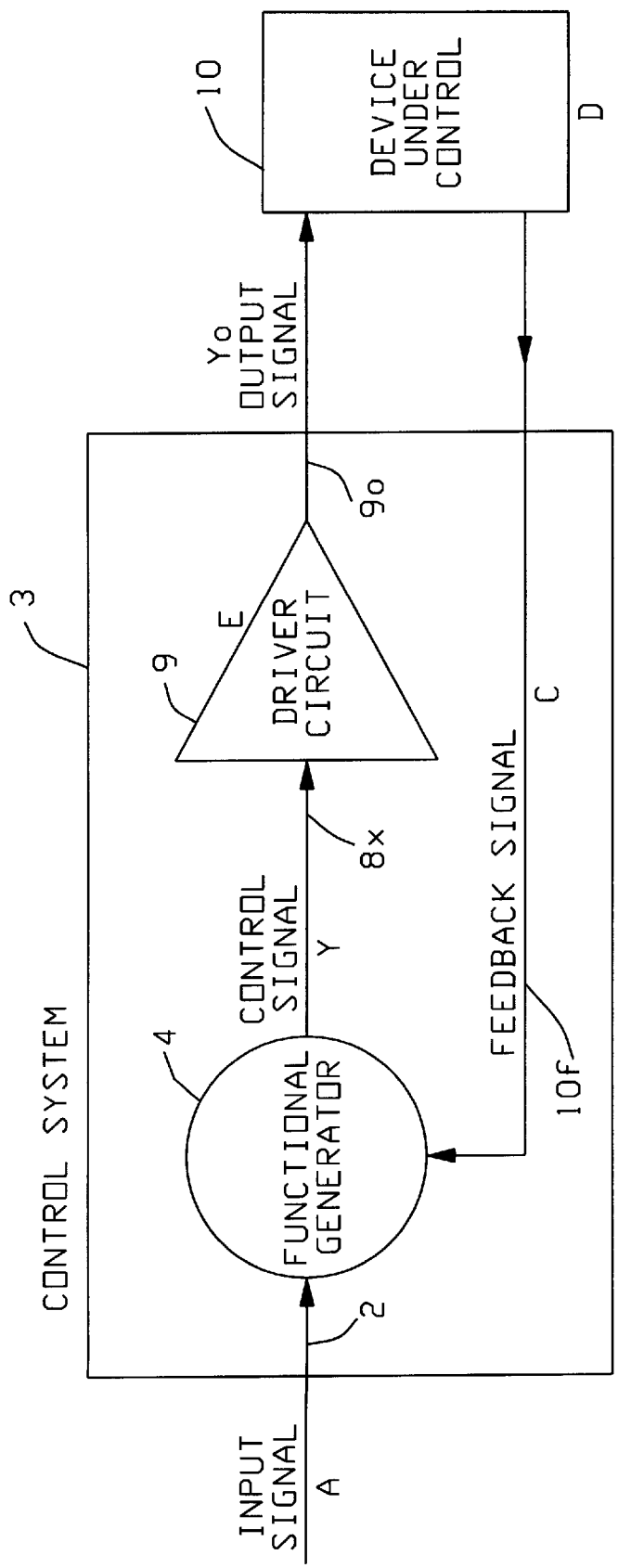
FIG. 3 is a diagram of a generalized control system wherein an input signal, Ai determines a control signal Y which is driven to provide an output control signal Yo.

FIG. 3 illustrates a functional block diagram of a general control system. In FIG. 3, the block D is a target device 10 or item to be controlled. This could be a positional motor or any other controllable device. The signal Yo on line 9o is the output control signal which is fed out of the control system 3. Internal to the control system 3, is a driving circuit 9, which creates the signal Yo from its input Y, line 8x. The controlling signal Y is derived from the functional generator circuit 4. The functional generator 4 will be seen to receive two inputs from which it can create the signal Y (control signal) on line 8x. These two inputs to the functional generator 4 are the input control signal A on line 2 from the outside world and the feedback signal C on line 10f from the device under control 10.

Thus, the above FIG. 3 describes a simple, basic negative feedback control system. The focus of the present disclosure will concern itself primarily with the functional generator block 4 and the signal Y which is its output signal on bus Bx and bus 9o.

For any normal control system, the feedback signal C on line 10f is considered "negative feedback", that is to say, it subtracts in some way from the input control signal A on line 2 in creating the output control signal Y. Thus, if the device 10 under control is exactly where it should be (or has the condition which the input control signal A desires it to be), then the signal C would subtract from the signal A, such as to cause the signal Y to be "null" in value, and thus have no effect on the device 10 under control.

It can be imagined that the generation of the controlling signal Y from the inputs A and C can take on many forms, depending upon the nature of the device under control, 10.

Figure 4:
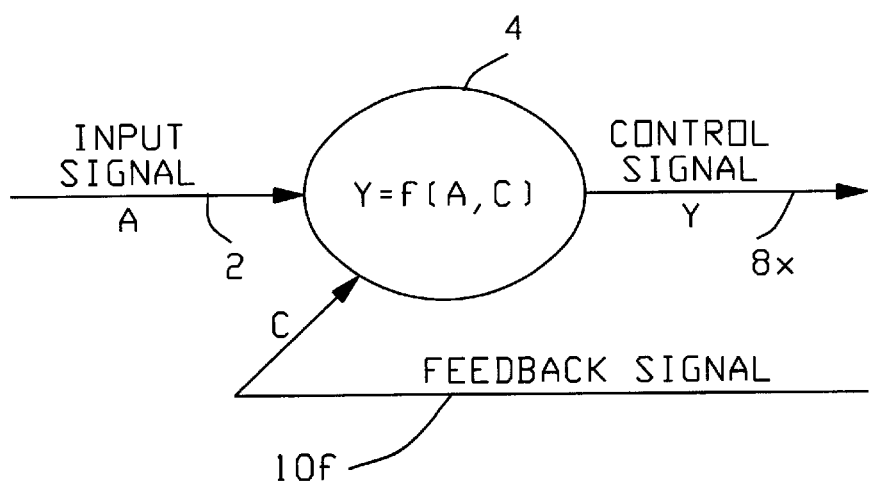
FIG. 4 is a diagram of the functional generator of FIG. 3.

FIG. 4 shows that the signal Y is some function of both A and C. That is to say, Y=f (A,C). The type of function depends upon the specific application involved. However, this function could be one of the prior mentioned mathematical relationships (of FIGS. 2A, 2B) described as a linear relationship. The implementation of this relationship in simple, standard digital logic is one focus of the present system and method.

Figure 2C:
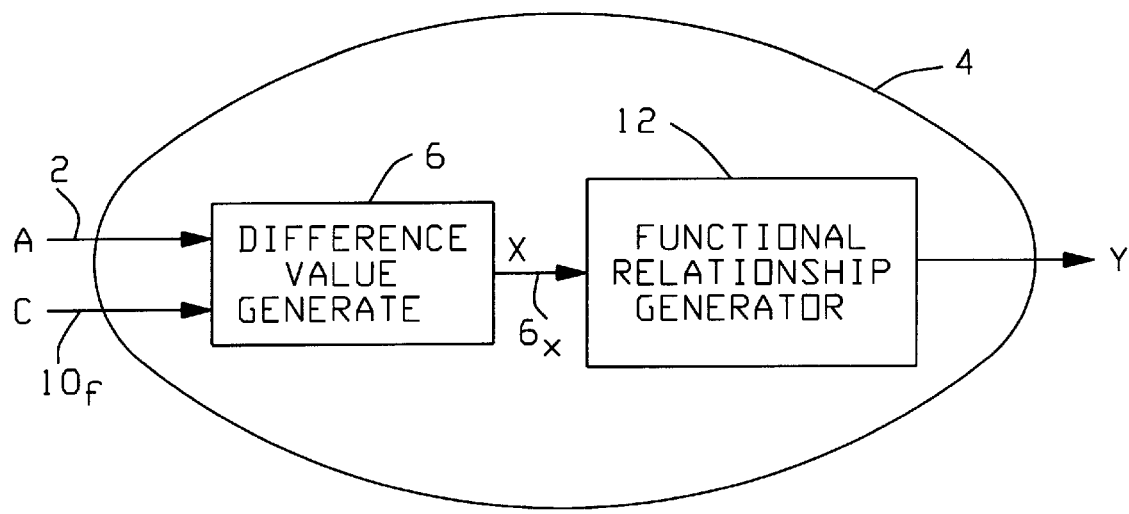
FIG. 2C shows a function generator for receiving an input and a feedback signal.
Figure 5:
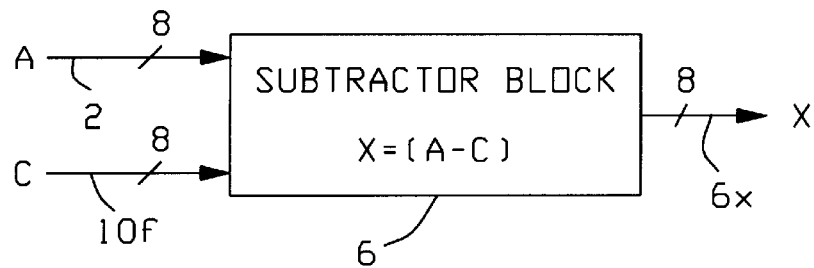
FIG. 5 is a block diagram of the Subtractor Block of FIG. 1.

In the control system, the signals A and C are combined to form a single value which can be designated as X on line 6x in FIG. 2C and FIG. 5. Thus, as seen in FIG. 2C, X=(A–C), which is a "difference" value which is generated.

If the desired functional relationship between the controlling signal Y and the difference variable X is to be "linear", then, in such case, the controlling signal Y would vary in a smooth, straight-lined fashion linear relationship to the difference value X.

Thus, FIGS. 2A and 2B does show such a relationship. Such a functional relationship would indicate that no matter how far off from the null point (where X=0) the device may be, the controlling signal Y will only be as large as the "slope" that is provided by the straight, linear line shown in FIGS. 2A and 2B.

FIG. 2C shows a function generator 4 having inputs A and C which operate through a difference-value generator 6 which correlates to the Subtractor block 6 of FIG. 1. The module 6 provides a digital output signal on bus 6x designated as X, which represents X=A–C. This is fed to the functional relationship generator 12 which provides the digital output signal Y.

Correlating FIG. 2C to FIG. 1, it will be seen that the functional relationship generator 12 is a module which represents the multiplier 7 and the Adder 8.

Figure 2D:
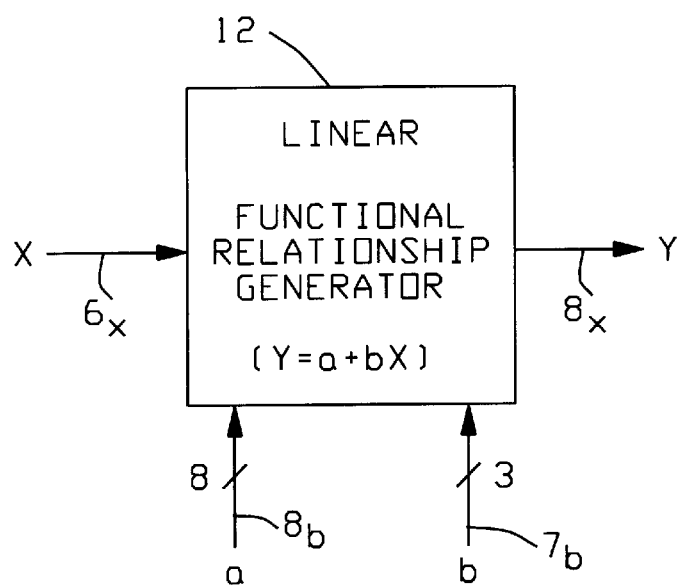
FIG. 2D is a generalized block showing the needed inputs to process the output control signal.

FIG. 2D shows a basic block diagram of the functional relationship generator 12, which is provided with the input signal X on bus 6x, which also has an 8-bit input signal "a" on bus 8b and a 3-bit input signal "b" on bus 7b. This block 12 thus functionally implements the signals of "a" and "bX" to form the output signal Y. As previously mentioned, "a" is the intercept value and "b" is the slope of the relationship curve of FIGS. 2A and 2B, and includes the variations of "b" seen in FIG. 2E.

Difference Value "X" Generation

In order to implement the Function Generator 12 (FIGS. 2C, 2D) in digital logic, the first item that must be created is the difference value X, which was shown in FIG. 2C. For a negative feedback control system, X is the difference between the input control signal A and the feedback signal C. There may be several methods of creating a digital value (in this case, a byte of 8 bits), representing X which results from A–C. The method described herein will use the Subtractor 6, the Multiplier 7 and Adder 8 seen in FIG. 1 to generate the digital output control signal Y.

Subtractor Circuit Implementation

This implementation is shown in FIG. 5 for simplicity. The two incoming signals A and C are assumed to be 8-bit binary values. The method and system is not concerned as to how signals A and C became 8-bit binary values. However, there could be several possibilities from which A and C are derived:

(1) Digitized analog signal;

(2) Some digital logic producing a binary value (such as a microprocessor or controller).

(3) Digital binary counters which sum up the clock times A or C when they are active.

In FIG. 5, there is seen the Subtractor block 6 which has a first 8-bit binary input signal A which is fed to module 6. In addition, feedback signal C is an 8-bit binary input which is fed into the module 6.

Figure 6:
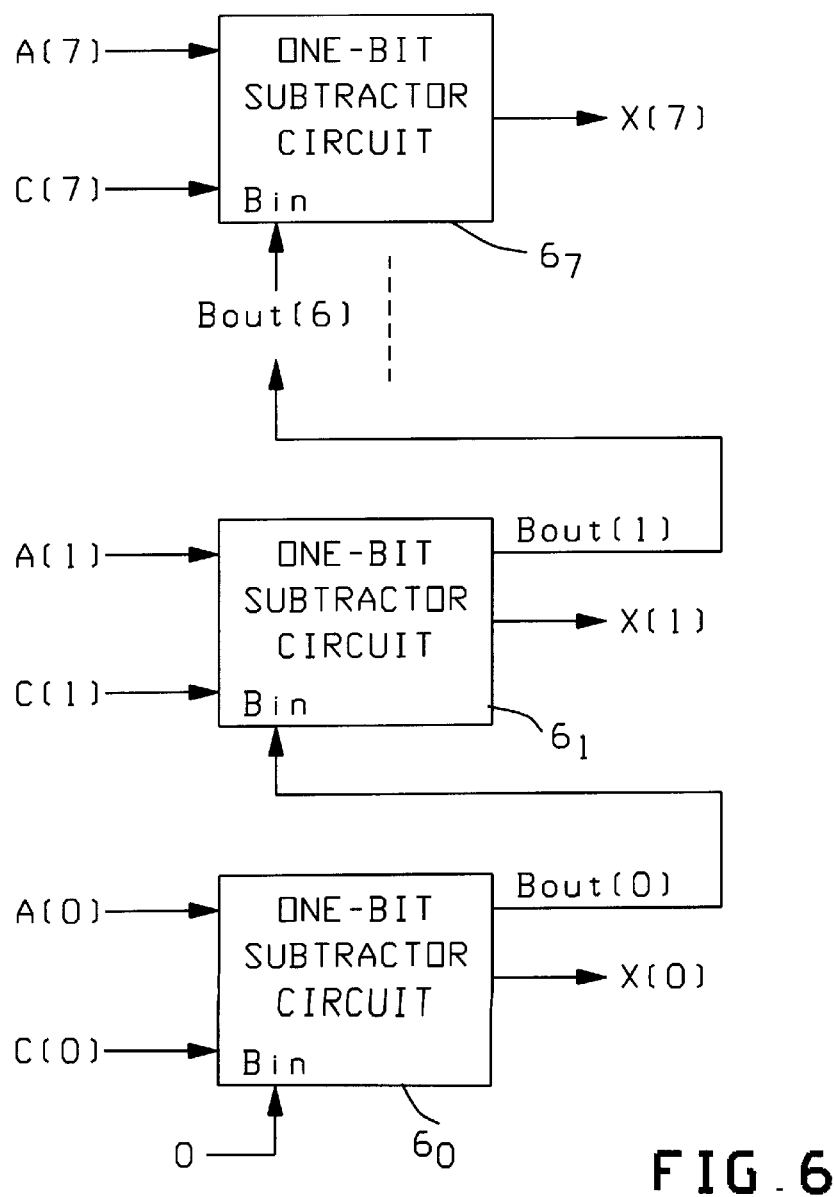
FIG. 6 is a drawing showing how the Subtractor block of FIG. 5 is implemented.

The Subtractor circuit of FIGS. 5 and 6 can easily be implemented in a PAL or a Field Programmable Gate Array (FPGA) device. The final output of the Subtractor is the difference variable X, where X=(A–C). Thus, X also is an 8-bit binary bus value. FIGS. 5 and 6 show the internal elements of the Subtractor circuit. It is made up of 8 identical 1-bit Subtractor circuits designated $6_1$, $6_2$, . . . through $6_7$. Each 1-bit Subtractor receives 1 bit from each of the two input busses, A and C. This then creates 1-bit of the output bus X. Each of the 1-bit Subtractor circuits also receives a "borrow-in" bit, designated BIN, and this sends a "borrow-out" bit, BOUT. These borrow bits are connected as shown in FIG. 6 to ripple up through the 8 bits of the output bus, 6x.

The logic to implement a 1-bit Subtractor is shown in Table I below which shows all the possible values of the 3 input bits Bin(n), A(n), C(n) and the resultant two output bits, X(n), Bout(n).

TABLE I

| INPUT BITS | | | OUTPUT BITS | |
|---|---|---|---|---|
| Bin(n) | A(n) | C(n) | X(n) | Bout(n) |
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 |

(Nomenclature X(n) indicates one bit, the "nth of the X bus.)

Table II gives the logic equations for the two output bits, X(n) and Bout(n).

TABLE II

X(n) = A(n)/ * Bin(n)/ * C(n)      (a 3-input exclusive-or function)
     + A(n) * Bin(n)/ * C(n)/
     + A(n)/ * Bin(n) * C(n)/
     + A(n) * Bin(n) * C(n)
Bout(n) = A(n)/ * C(n) + A(n)/ * Bin(n) + Bin(n) * C(n)

(/ = inversion; * = logical-and; + = logical-or)

Linear Function Implementation

Once the difference—value X has been generated, as is illustrated in the subtraction method of FIGS. 5 and 6, then the Function Generator 4 of FIG. 3, can be used to generate the desired linear output signal Y (control signal). The special relationship between the signals X and the signals Y and Yo provides the desired control signal to the digital device 10.

As was noted in FIG. 2B, the intercept element "a" is a constant value. If X=0, then Y="a". Thus, this is an additive to the X portion of the linear equation. In the simplified case of implementing a linear functional relationship, it might be easily assumed that "a" is 0, that is to say, no intercept. However, in the general case, some constant value for "a" will generally be used. In the following implementations presented below, several cases are described.

When the slope element "b" is a constant value, that is seen to be a multiplier (module 7 of FIG. 1) in the linear equation. The basic linear equation involved here is:

$$Y = a + bX \qquad \text{(FIG. 2B)}$$

Here, "b" is the more important element, rather than "a", since "b" multiplies the effect of X onto the created value of Y. Here, two particular cases will be looked at. The first is a case where "b" is a value of "1". In such a case, any change in X maps directly and exactly into the same value of Y.

The second case allows a positive value for "b", and here the value of X is multiplied by "b" in order to produce Y.

It should be noted that since these functions are implemented in digital logic, and since "2" is the base for any binary digital numbers, then the values for "a" and "b" will be in powers of 2, that is to say, $1=2^0$, $2=2^1$, $4=2^2$, $8=2^3$, $16=2^4$, $32=2^5$, etc.

FIG. 2C illustrates a general version block diagram of the linear function generator designated 12. FIG. 2D shows the linear function generator 12 with extra inputs a, b. As will be seen, there are two operations necessary on the signal X of FIG. 2D in order to create the output signal Y. First, X must be multiplied by the constant value of "b". Secondly, the constant value of "a" must be added into the calculation. The net result is thus to provide a value of Y that meets the linear function general equation of Y=a+bX.

Figure 9:
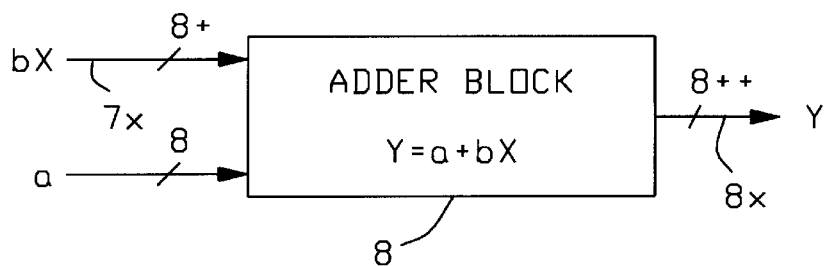
FIG. 9 is a block diagram of the Adder block of FIG. 1.

FIG. 9 shows the two additive portions of the Adder method of the linear relationship generator. These portions are the "multiply by b" (the slope) and the "add in a" (involving the intercept).

Multiply-By-b Implementation

Figure 2E:
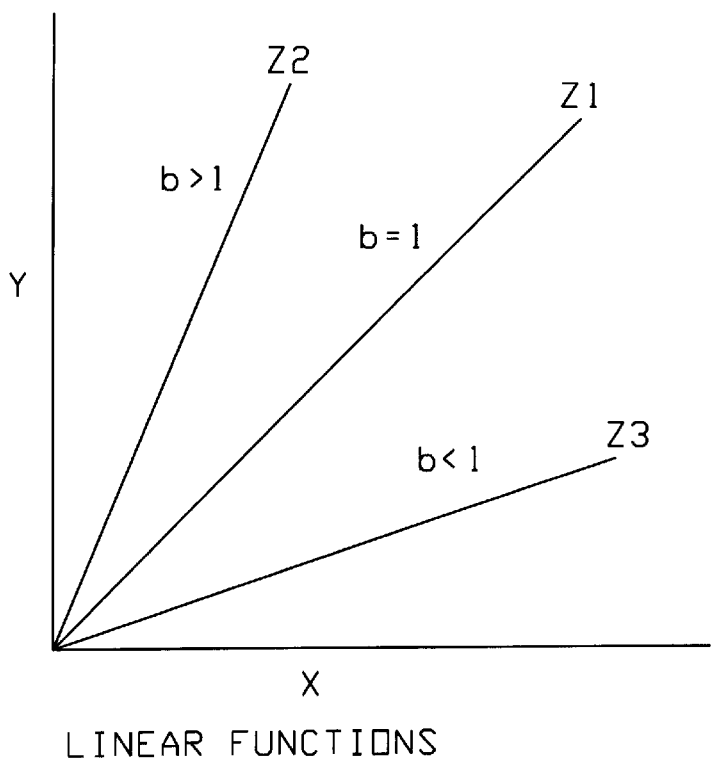
FIG. 2E is a X-Y linear function diagram illustrating different slope values "b"

FIG. 2E shows the relationship between X and Y for three values of the slope "b". The first graph Z1 is for a unity slope (b=1). This is the simple case where X maps directly into Y, that is to say Y=X.

The second graph line of FIG. 2E shown as Z2 is for slopes which are greater than 1, for example, 2 or 4. In such cases, Y is greater than X by the multiplication factor of "b", for example, 2 times or 4 times greater.

Figure 10:
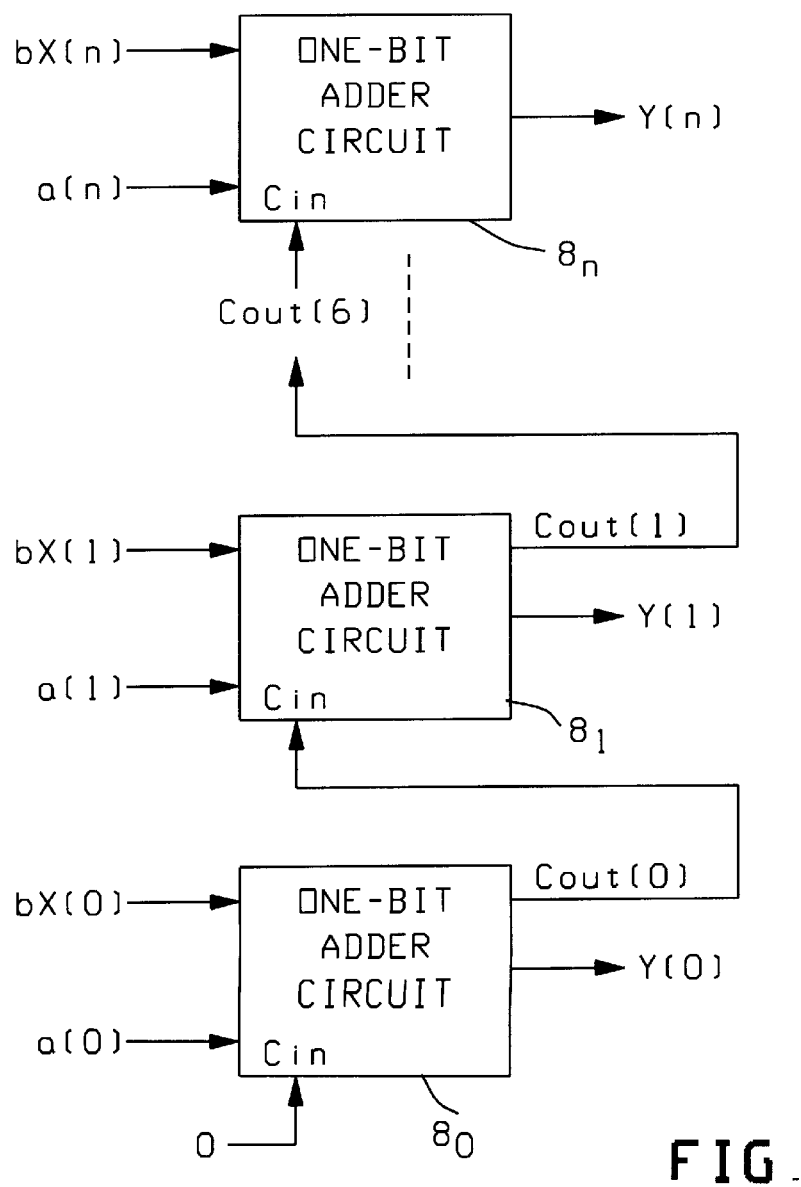
FIG. 10 is a drawing showing a implementation of the Adder block of FIG. 9.

The third graph line of FIG. 10, line Z3, is for slopes which are less than 1, for example ½ or ¼. Here, Y is smaller than X by this fractional factor, that is to say, ½ or ¼.

In the binary notation, digital logic multiplication by powers of 2 is accomplished by simply shifting a binary number to the left, or shifting to the right by a few bit positions. This is illustrated in Table III. Thus, if the binary value of X is shifted one position to the left to create Y, then X is multiplied by 2 so that Y equals 2X. Further, if X is shifted 2 positions to the left in creating Y, then X is multiplied by 4, thus giving Y=4X.

Figure 8A:
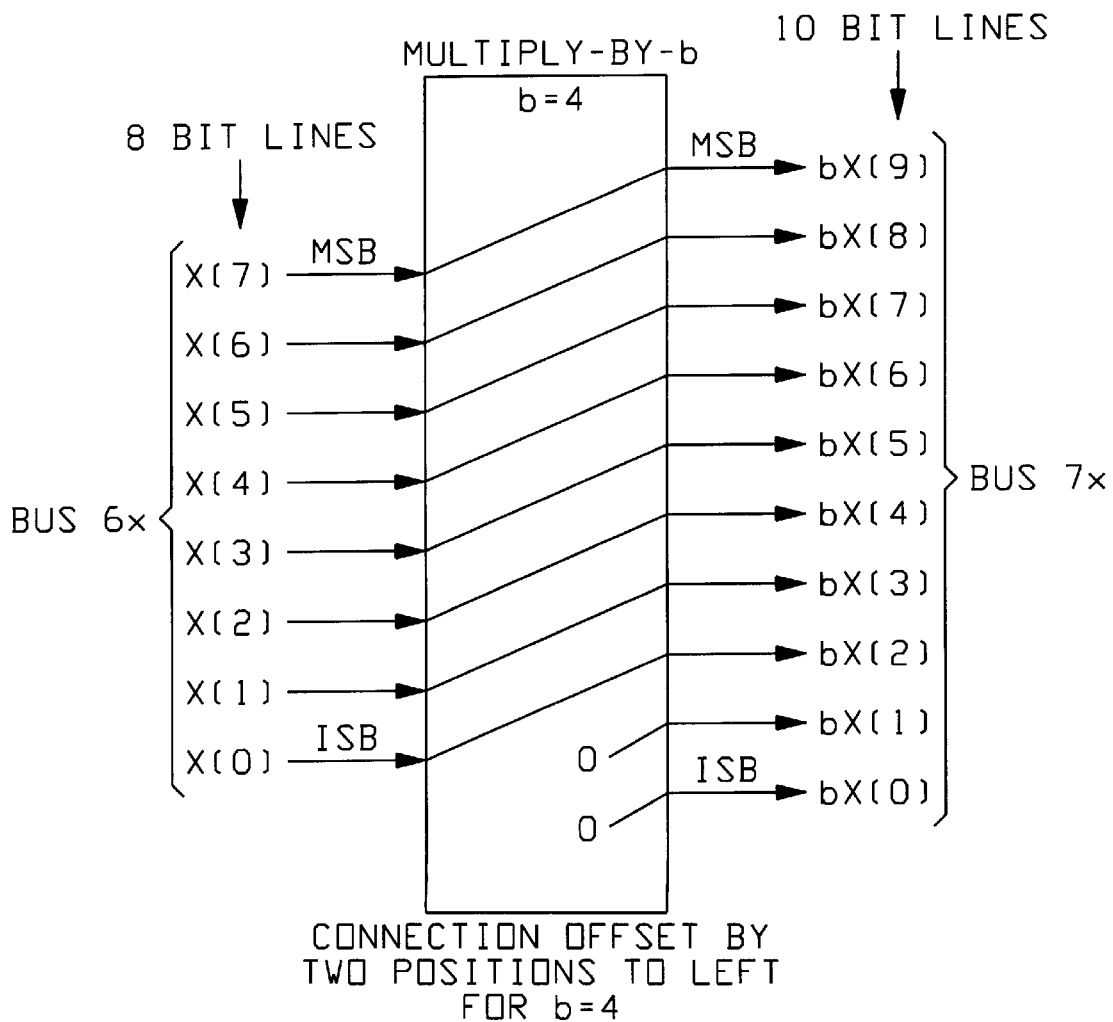
FIG. 8A is a drawing showing the implementation of the "multiply by b" block for a fixed value of "b"

Conversely, if the binary value for X is shifted one position to the "right" in creating Y, then X is multiplied by ½ so that Y equals ½ of X. Likewise, if X is shifted 2 positions to the "right" in creating Y, then X is multiplied by ¼ so that Y=¼ of X. FIG. 8A indicated the example where b=4, causing a shift up of 2 positions.

The unity case is implemented by direct connection of all the bits of X to the corresponding bits of Y, so that there is no off-setting or shifting in either direction, i.e., there is direct mapping.

FIG. 8A showed the "multiplication-by-b" block 7 for the example case of b=4. Here, the intermediate signal "bX" on bus 6x is shown. This is a portion of what creates the value of Y. It is important to note that since multiplication here can produce number values much larger than the number values that were initially used, then it is seen that bX must involve more bits than does the value of X in bits, so that the output bus is expanded in size with added bit lines.

In the example of FIG. 8A where (b)=4, the 8-bit value of input X has a maximum value of 255 in decimal notation. Now since bX=4, it is seen that Y has the possible maximum value of 1020 (decimal notation) and this requires a 10-bit bus for bX in order to hold the full number. Thus, while the input involves an 8-bit bus, then after multiplication by b, it is seen that the output requires a 10-bit bus in order to hold the full number.

It will be seen that, in the actual implementation of this Multiplier element, that no shift register is used. It is merely a matter of connecting the individual bits of the X input lines to the appropriate bit positions of the output bX lines of FIG. 8A. Table III below gives the connection mapping between X and bX for 5 different values of b.

TABLE III

| "b" | X(n) ⇒ bX(0) Connections | | Comment |
|---|---|---|---|
| 1 | X(0) | ⇒ bX(0) | direct map connections |
|   | X(1) | ⇒ bX(1) | |
|   | X(n) | ⇒ bX(n) | |
| 2 | 0 | ⇒ bX(0) | offset (shift) up one position |
|   | X(0) | ⇒ bX(1) | |
|   | X(n) | ⇒ bX(n+1) | |
| 4 | 0 | ⇒ bX(0) | offset (shift) up two positions |
|   | 0 | ⇒ bX(1) | |
|   | X(0) | ⇒ bX(2) | |
|   | X(n) | ⇒ bX(n+2) | |
| ½ | X(1) | ⇒ bX(0) | offset (shift) down one position |
|   | X(2) | ⇒ bX(1) | |
|   | X(n) | ⇒ bX(n−1) | |
| ¼ | X(2) | ⇒ bX(0) | offset (shift) down two positions |
|   | X(3) | ⇒ bX(1) | |
|   | X(n) | ⇒ bX(n−2) | |

Figure 8B:
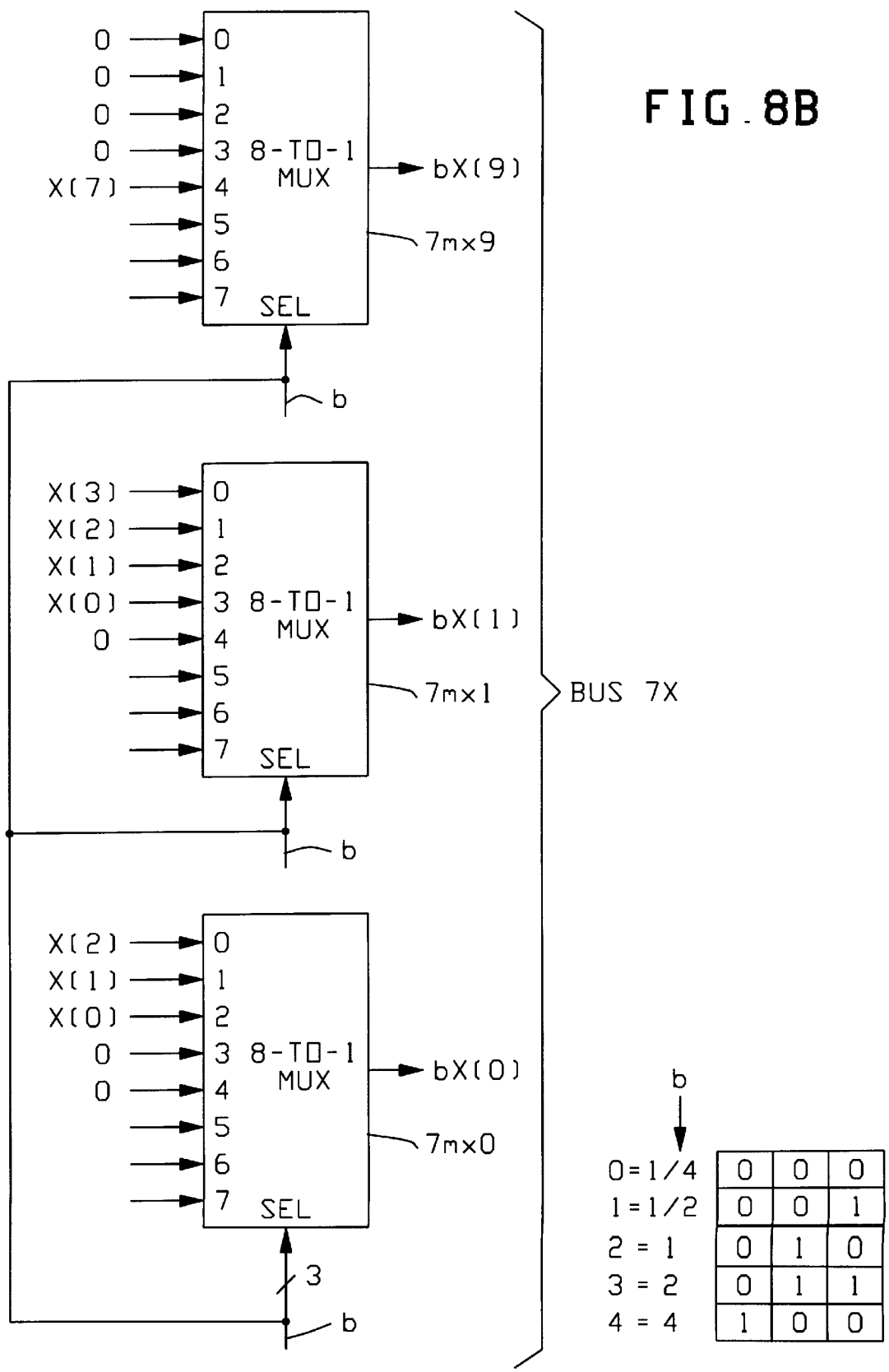
FIG. 8B shows the implementation for a variable "b"

Very often, the linear parameters b and a are constants for a given design. Thus, if b is a fixed constant, the implementation of the multiplication-by-b function, is a basic bus connection scheme which is shown in FIG. 8A. However, if some variability of the b parameter is needed, then a variable inter-connection scheme must be implemented as in FIG. 8B. It will be seen that cascaded multiplexer chips provide the job of accomplishing such a variable interconnection method. FIG. 8B indicates the basics of such an implementation.

Table IV shown below indicates the multiplexer selection with control term equations. Note that five case situations for "b" are shown, and "b" is assumed to be a 3-bit binary bus. This 3-bit "b" bus and the b slope values are also shown in FIG. 8B.

TABLE IV

| "b" | multiplexor input selected (Fig. 8B) | multiplexor select terms (b-bus values) |
|---|---|---|
| ¼ | 0 | 000 |
| ½ | 1 | 001 |
| 1 | 2 | 010 |
| 2 | 3 | 011 |
| 4 | 4 | 100 |

Figure 7:
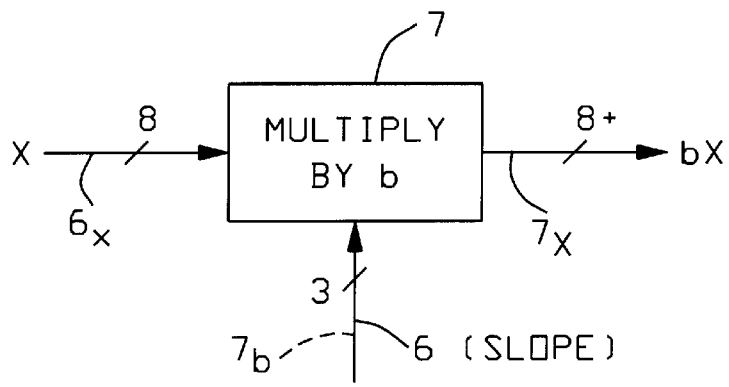
FIG. 7 is a block diagram of the "multiply by b" block of FIG. 1.

FIG. 7 is a block diagram of the multiplier module 7 of FIG. 1. Here, the difference-signal X on 8-bit bus 6x is fed into the multiplier module 7. Additionally, a 3-bit bus 7b feeds the slope signal "b" (normally constant for each particular design) into the multiplier module 7. This multiplier factor represents the slope b of FIG. 2E and is also shown in Tables III and IV.

It should be noted that the output signal of the multiplier 7 is shown as bX and is indicated as having bus bits "8+" to indicate that this bus is larger than the input bus 6x of 8-bits.

FIG. 8A is a diagram showing how the multiplication of the amount by "b" occurs when the value of "b" is a "fixed" value, for example, such as b=4.

Here, in FIG. 8A, it will be seen that the 8-bits of X are shown designated as $X(0)$, $X(1)$, $X(2)$ ... $X(7)$ which indicates the bits of the X bus 6x as operating from the lowest significant bit LSB at $X(0)$ up to the most significant bit MSB at $X(7)$, giving a total of 8 input bits.

Under the concept of digital multiplication when the multiplier is "b"=4, this means that the base unit 2 is raised to the second power, so that $2^2=4$, and the exponential 2 means that the connection is offset by two positions to the left, when "b"=4.

Thus, as seen in FIG. 8A, the output lines designated bX(n) will be seen to go from n=0 up to n=9 to give a total of 10-bit lines for the output bus 7x, which indicate from the least significant bit (LSB) to the most significant bit (MSB) as the output lines.

Thus, the multiplication module 7 here has increased the bus size from 8-bits up to 10 bits in order to characterize the new signal output bX(n).

Table III shows FIG. 8A in tabular form. This table shows the multiplication for simple values of slope "b". The third row (b=4) is the implementation shown in FIG. 8A. As long as the specific application can tolerate slope values for "b" that are powers of "2", then, as seen in FIG. 8A, the implementation of multiplication logic is very simple.

The previous drawing on FIG. 8A represented the situation when the value of "b" was a fixed value, such as b=4. On the other hand, when "b" is a variable value, then FIG. 8B indicates the circuitry used in order to multiply by b when b is a specifically different value.

The parameter "b" is not actually a variable but can have different values for different applications. FIG. 8B shows how the implementation can adjust "without hardware changes" to handle new values of "b". If a designer was not sure about the slope required in a system until doing the "debug" operation, the designer could use the FIG. 8B implementation. This requires a bit more hardware but still could be inserted in part of a Field Programmable Gate Array at minimal hardware cost.

Here in FIG. 8B, there are seen a series of multiplexers designated 7mxo, 7mx1, 7mx2, ... 7mx9. Each of these multiplexers share an input select 3-bit bus designated "b", which are used for selection purposes in each of the individual multiplexers. It will be seen that each individual multiplexer has a different set of X input bits and each multiplexer will provide a separate bX output designated bX(n), where n can vary from 0 to 9.

The value of b for the input select line of each multiplexer is shown for various values of b as indicated in Table IV, and also in FIG. 8B.

FIG. 8B implements all the rows (combinations) of Table III whereas FIG. 8A only implements a single row where b=4.

Now that the multiplier block 7 of FIG. 1 has been implemented in order to provide the signal bX, the next operation is the implementation of the Adder 8 of FIG. 1. This is shown in FIGS. 9 and 10.

The Adder block 8 of FIG. 9 is indicated as performing the operational function to provide Y=a+bX. The Adder block 8 has a first group of digital input bus signals bX on bus 7x which involve a number of input lines greater than the original 8-bits that were used in the prior multiplier module. Additionally, the intercept value "a" consists of 8-bits which are fed to the Adder block 8. The Adder block 8 is seen to provide an output signal Y on bus 8x of 8++ to indicate that there has been an expansion of the bus to include more digital bit lines than bus 7x.

The implementation of the Adder block of FIG. 9 is shown in FIG. 10. FIG. 10 indicates a series of 1-bit Adder circuits designated $8_0$, $8_1$, $8_2$, . . . $8_n$. Each one of the 1-bit Adder circuits has an input a(n) and an input bX(n) where n can range from 0 up through a higher number n. The 1-bit Adder circuits are concatenated so that a carry out Cout(n) signal is fed in a cascading fashion up from one Adder circuit to the other. As a result, the series of 1-bit Adder circuits will provide a series of digital signal lines which present bus Bx as the Y signal showing Y(o) up through Y(n).

It should be noted as seen in FIG. 9 that the Y signal is designated as 8++ since this represents a further expansion of the number of digital signal lines from those that were inserted on the input bus 7x.

Adding "a" to bX

Referring to FIG. 9, once the intermediate value of bX is created from X then the intercept parameter "a" must be added to produce the general linear relationship. For the Adder method, the standard binary addition method is used. FIGS. 9 and 10 show the Adder implementation.

In FIG. 9, "a" is shown as an 8-bit value. The bX bus is shown as being "8+" bits wide. Thus, the value for Y then must be seen to be even wider and is shown as "8++" bits wide.

FIG. 10 shows that the Adder is a series of identical 1-bit Adder circuits 8o through 8n. Each receives 1-bit from the bX(n) bus and the "a" parameter value a(n). Also, a single "carry-in" designated "Cin" bit is used as input. Here, each 1-bit Adder produces 1-bit of the output bus Y(n) and also a single "carry out" bit designated Cout(n) bit. The carry bits are connected as shown so they can ripple up through the bus bits. The logic for implementing a 1-bit Adder is given here for clarity and shown in Table V. Table V shows all the possible combinations for the 1-bit Adder.

TABLE V (Nomenclature bX(n) indicates one bit, the "nth" of the bX bus.)

| INPUT BITS | | | OUTPUT BITS | |
|---|---|---|---|---|
| Cin (n) | bX (n) | a (n) | Y (n) | Cout (n) |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Linera Function Adder Method for Device Control

Figure 11:
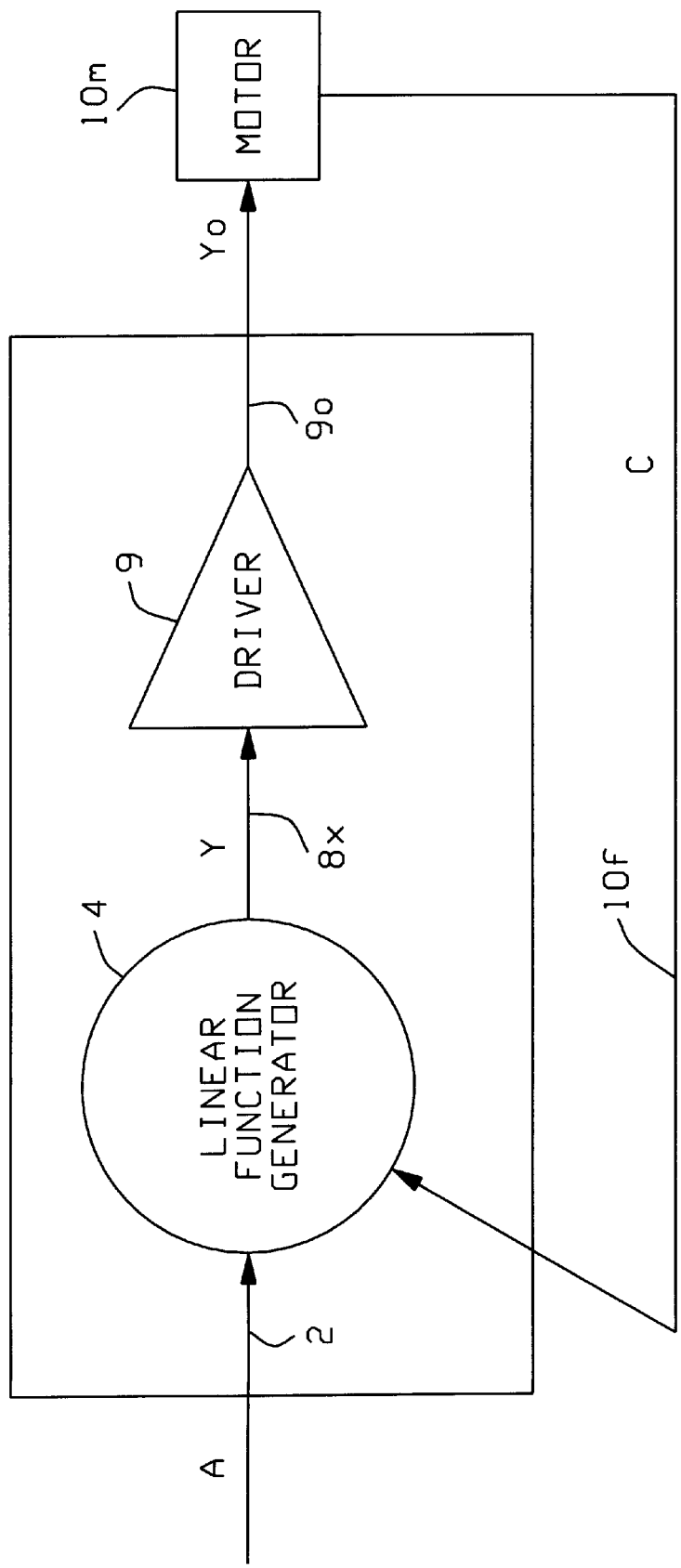
FIG. 11 is a block diagram of a control system for an output target device as a motor.

Referring to FIG. 11, there is shown a block diagram of the linear relationship Adder method. This figure combines the functions of FIGS. 1, 3, 4 and 2C to perform the development of the output signal Y to fulfill the function Y=a+bX.

Figure 12:
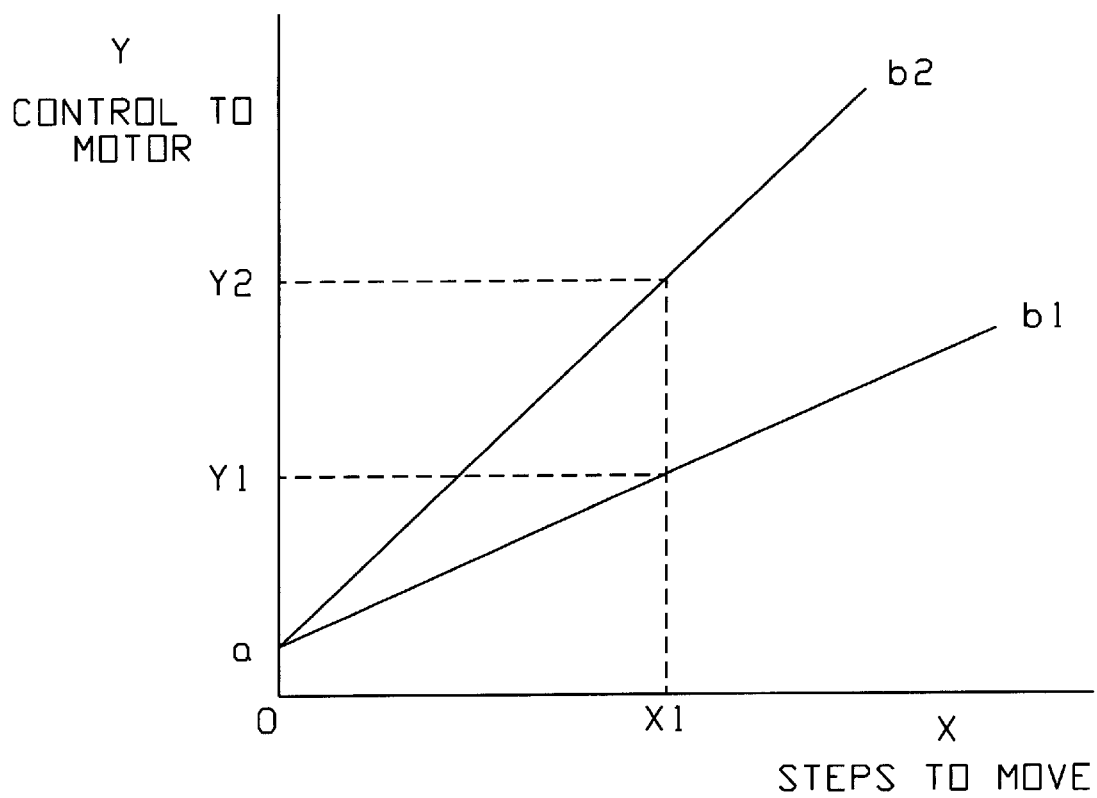
FIG. 12 is a chart of slopes for control signals Y to a target receiving device (motor)

One possible implementation of the use of this linear relationship by the Adder method is indicated in FIGS. 11 and 12. In FIG. 11 there is seen a simple control system 3 to control the positional movement of a motor 10m. The motor can be made to move in tiny positional steps when a control voltage derived from the output value Y is applied.

As the motor moves, then for each positional step movement, a feedback pulse is returned which is accumulated and shown as the signal value C. The input signal A specifies how far or how many steps the user wishes the motor to move. Thus, the difference value X=A−C, is a measure of the "difference" between the number of steps desired by the user and the number of steps already taken. Thus, when X=0, it is seen that the motor has moved to the desired position.

The described linear function will be seen to be appropriate for such an application. For example, the control signal Y, from which the actual control voltage to the motor is derived, is directly proportional (linear) to the number of steps needed to yet move the motor as represented by the signal X.

Thus, the steps shown in FIGS. 11 and 13, which involve feeding the signals A and C to the Subtractor 6 to develop the output signal X which is then fed to a module 7 for multiplying by "b" to provide an output signal designated bX which is then fed to the Adder 8 which factors in the intercept "a" then provides the output signal Y. It should be noted that, each of the input busses A and C marked in FIG. 11 are 8-bit busses in order to provide the final output signal Y as being equal to a+bX.

Thus, the standard linear equation, Y=a+bX, will be seen to fit this application adequately. From FIG. 12, it will be seen how large a value of the signal Y is relative to X and this depends upon the multiplication factor, b, which is the slope. FIG. 12 shows two cases. It can be noted that for comparing the slope b2 versus b1, for the same X value, such as X1, b2 slope gives a larger value for Y shown as Y2. The slope factor "b", might be considered as a motor-dependent parameter relating to torque and acceleration elements. If more voltage is needed for each count of X, then a larger slope parameter b could be used.

Also, as further seen in FIG. 12, it will be noted that the intercept parameter "a" represents an initial value in Y when there is no value (0) for X. This applies in the given example. Thus, this might require some small bias voltage to hold the motor position fixed at the time when X is 0. Also, there might be a requirement for some initial bias value to overcome friction when moving the motor only a few steps.

Methodology Sequence

FIG. 13 indicates a flow chart for a target device or motor control system utilizing the linear function Adder method. Here, the user provides an input value A of the number of steps required to move the motor a certain distance. This is shown as step 1, where the user output provides the A signal.

At step 2, the method requires creation of the difference value by subtracting the feedback signal C to provide an output signal X, where X=A−C.

Then at step 3, there is created a control signal based on the specific motor parameters according to the Adder/Multiplier relationship which was indicated in FIG. 11. This provides an output signal Y which is equal to a+bX.

At step 4, the driver 9 of FIG. 11 provides the appropriate motor voltage based on the signal Y.

At step 5, the motor moves the required amount. At step 6, the feedback signal C monitors the motor steps that the motor has taken and feeds the signal back to step 2, such that when the C signal has been reduced to 0, then the proper positioning of the motor has been accomplished and no further action is necessary.

Described herein has been a system and method by which analog operating circuitry and elements can be converted to digital operational and control elements in order to provide digital signals which will result in digital control of a targeted digital receiving device, such as a motor or other appliance. This provides a very efficient way of accomplishing control signals with electronic modules since they can be converted to digital signals which can be implemented and controlled with inexpensive standard programmable array logic units (PALs) and also Field Programmable Gate Arrays (FPGAs) which generally have many surplus circuits available for utilization.

What is claimed is:

1. A method for establishing a digital output control signal Y for a target digital device with use of a programmable functional relationship generator, wherein a programming parameter "b" represents the mathematical slope relationship between a digital difference-signal X and a digital output control signal Y, where Y is in a linear functional relationship with X and wherein an intercept parameter "a" represents the digital value of Y when X is zero, comprising the steps of:

(a) generating a first input digital signal A for establishing a setting-parameter for said target device;

(b) subtracting a digital feedback signal (C), received from said target device, from said first input digital signal A to form a digital-difference signal X;

(c) processing said digital-difference signal X via said programmable functional relationship generator;

(d) digitally multiplying said digital-difference signal X by a programmable slope-parameter "b" to develop a digital product bX;

(e) adding a digital intercept parameter "a" to said digital product bX to generate said output digital control signal Y.

2. The method of claim 1 which includes the step of:

(f) amplifying and adapting said digital output control signal Y with a driver unit to feed digital control signals to said target digital device.

3. A method implemented with a linear function generator utilizing available gates in PALs and FPGAS, for efficiently developing a digital output control signal Y to a target digital device comprising the steps of:

(a) digitally reducing the value of an input-setting digital signal A by digitally subtracting the value of a digital feedback signal C, from said target device, to generate a digital difference-signal X;

(b) digitally multiplying the digital signal X by a digital slope parameter value "b" which establishes a programmable linear relationship between Y and X, thus to develop a digital value of bX;

(e) digitally adding to bX, a digital parameter "a" which indicates the digital value of Y when the value of X−0, thus to generate an output digital control signal Y−a+bX.

4. The method of claim 3 which includes:

(d) transferring said digital control signal Y, via a device driver, to said target device.

5. A system for digitally enabling the implementation in FPGAS of digital control signals for a target digital device in a network where an N bit difference signal X is in a linear functional relationship to an expanded bit output control signal Y, having a greater number of bits than signal X, said system comprising:

(a) means to generate a desired input setting digital signal A for regulating and controlling said target device in a network where an N bit difference digital signal X is in a linear functional relationship to an expanded bit output digital control signal Y, having a greater number of bits than signal X;

(b) digital feedback signal C means from said target device, for comparison with said digital signal A, which indicates any deviation from said desired input digital setting signal A;

(c) means to digitally develop a digital difference signal X to indicate the deviation of C from A;

(d) digital means to generate a digital output control signal Y which executes the linear function Y=a+bX where "a" is the digital parametric intercept value of Y when X is zero and "b" is a programmable digital parametric value which indicates how the Y value changes with the value of X.

6. The system of claim 5, wherein said digital signal A and said digital signal C and said intercept value "a" each constitute N parallel bits;

and wherein said difference digital signal X constitutes (N+q) parallel bits where q represents a digital offset value corresponding to a specific digital parameter slope value "b";

and wherein said slope value "b" constitutes a k-bit digital signal where k is less than N;

and wherein said digital control signal Y constitutes (N+q+s) parallel bits where s represents a digital offset value corresponding to a specific slope value of said k-bit signal "b".

7. The method of claim 5 wherein step (d) includes the step of:

(d1) adjusting the value of the slope-parameter "b" to amplify or de-amplify the effect of said digital difference signal X on the output digital control signal Y.

8. A method utilizing a linear function generator which implements in Field Programmable Gate Arrays the linear function Y=a+bX wherein said linear function generator has an input x which represents the digital difference value between a feedback signal from the target device and a setting parameter A and where "a" represents the original value of said linear function and "b" represents the programmable slope or rate value of the function while Y represents the output control signal to be imposed upon the target device under control, said method comprising the steps of:

(a) retrieving feedback signals from said targeted device which represent a present time operating condition of that target device;

(b) setting a desired parameter value A from which said feedback signal C is subtracted in order to provide a difference value generated as signal X;

(c) utilizing functional relationship generator means for taking said signal X and multiplying it by a programmable slope rate "b" plus adding the intercept "a" in order to satisfy the equation Y=a+bX;

(d) transmitting said control output value Y to said target device in order to bring about a desired operating relationship in said target device.

* * * * *